United States Patent
Sala et al.

(10) Patent No.: US 7,333,513 B2
(45) Date of Patent: Feb. 19, 2008

(54) METHOD, SYSTEM, AND COMPUTER PROGRAM PRODUCT FOR SYNCHRONIZING VOICE TRAFFIC WITH MINIMUM LATENCY

(75) Inventors: Dolors Sala, Atlanta, GA (US); Ajay Chandra V Gummalla, Atlanta, GA (US); Ted Rabenko, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 969 days.

(21) Appl. No.: 10/197,436

(22) Filed: Jul. 18, 2002

(65) Prior Publication Data

US 2003/0067944 A1 Apr. 10, 2003

Related U.S. Application Data

(60) Provisional application No. 60/327,298, filed on Oct. 9, 2001.

(51) Int. Cl.
- H04J 3/24 (2006.01)
- H04J 3/06 (2006.01)
- H04L 12/43 (2006.01)

(52) U.S. Cl. ..................... 370/473; 370/516
(58) Field of Classification Search ........... 370/235, 370/236, 474, 498, 516–519, 469, 471, 473
See application file for complete search history.

(56) References Cited

U.S. PATENT DOCUMENTS 6,654,957 B1 * 11/2003 Moore et al. ............... 725/111

(Continued)

FOREIGN PATENT DOCUMENTS

WO WO 01/19005 A1 3/2001

(Continued)

OTHER PUBLICATIONS

Rabenko, T.F., et al., "Cable Modem System with Sample and Packet Synchronization," U.S. Appl. No. 09/501,850, filed Feb. 10, 2000.

(Continued)

*Primary Examiner*—Chau Nguyen
*Assistant Examiner*—Marcus R Smith
(74) *Attorney, Agent, or Firm*—Sterne, Kessler, Goldstein & Fox, P.L.L.C.

(57) ABSTRACT

A supervisory communications node monitors and controls communications with a plurality of remote devices throughout a widely distributed network. A method, system, and computer program product are provided to convey and maintain information used to synchronize the packetization and burst operations within the network. During session setup, jitter constraints indirectly are used to explicitly communicate a synchronization timing reference. The timing reference is set at the beginning of a phase/period boundary used to service the session. In an embodiment, the announcement of the first grant is used as an explicit indication of the synchronization timing reference value. In another embodiment, the synchronization timing reference value is inferred if a remote device receives contiguous voice grants meeting certain conditions. In an embodiment implementing periodic scheduling, the actual arrival of the first grant is used to infer the synchronization timing reference value. In an embodiment, the present invention enables the synchronization timing reference value and/or the periodicity to be modified if network conditions indicate that packetization and burst operations are out-of-synchronization.

18 Claims, 7 Drawing Sheets

U.S. PATENT DOCUMENTS

| | | | | |
|---|---|---|---|---|
| 6,657,983 B1 * | 12/2003 | Surazski et al. | ............ | 370/337 |
| 6,707,821 B1 * | 3/2004 | Shaffer et al. | ........... | 370/395.4 |
| 6,711,132 B2 * | 3/2004 | Lazarus | ...................... | 370/236 |
| 6,763,032 B1 * | 7/2004 | Rabenko et al. | ............ | 370/442 |
| 6,847,635 B1 * | 1/2005 | Beser | ......................... | 370/352 |
| 6,856,786 B2 * | 2/2005 | Belostotsky et al. | ........ | 455/3.03 |
| 6,993,007 B2 * | 1/2006 | Gummalla et al. | ......... | 370/346 |
| 2002/0064169 A1 | 5/2002 | Gummalla et al. | ......... | 370/412 |
| 2002/0093912 A1 * | 7/2002 | Gummalla et al. | ......... | 370/229 |

FOREIGN PATENT DOCUMENTS

| | | |
|---|---|---|
| WO | WO 01/28147 A2 | 4/2001 |
| WO | WO 01/28147 A3 | 4/2001 |

OTHER PUBLICATIONS

Rabenko, T.F., et al., "Cable Modem System with Sample and Packet Synchronization," U.S. Appl. No. 09/501,892, filed Feb. 10, 2000, including Appendix pp. 1-45 and 91-246.

Glen Sater, Motorola Inc., "Media Access Control Protocol Based on DOCSIS 1.1," IEEE 802.16MC-99/16, Oct. 29, 1999, pp. 0-12.

European Search Report from European Patent Application No. 02257003.0, 3 pages, dated Feb. 9, 2004.

* cited by examiner

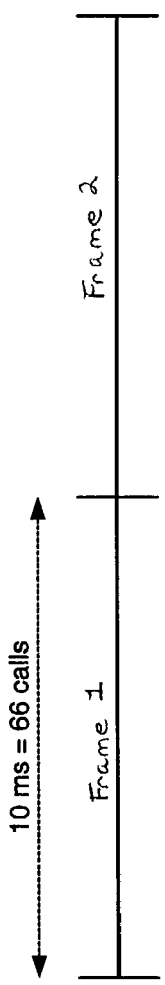
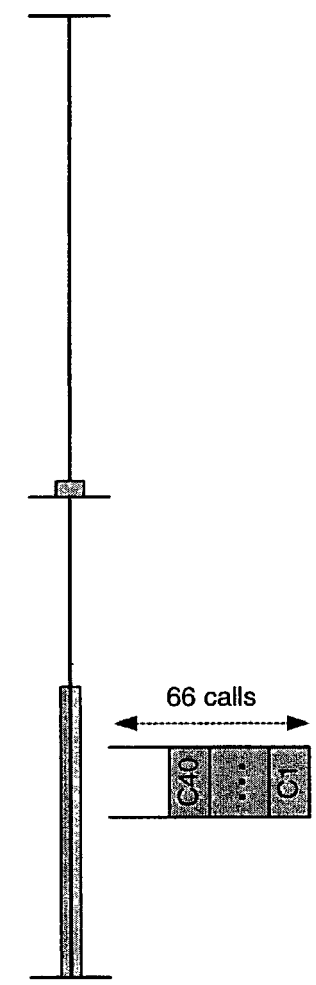
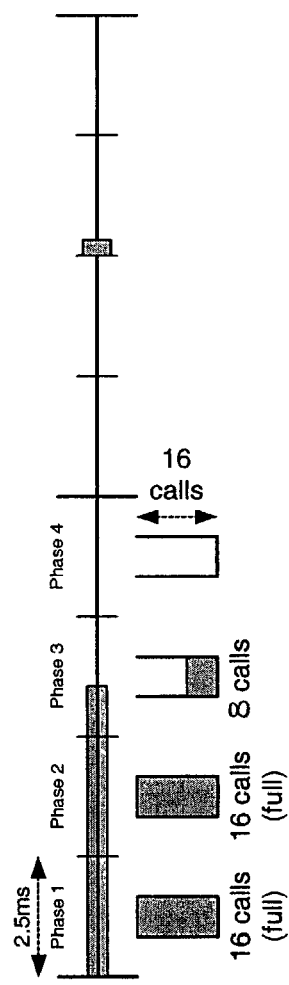
FIG. 4(a)
FIG. 4(b)
FIG. 4(c)
FIG. 4(d)

METHOD, SYSTEM, AND COMPUTER PROGRAM PRODUCT FOR SYNCHRONIZING VOICE TRAFFIC WITH MINIMUM LATENCY

This application claims the benefit of U.S. Provisional Application Ser. No. 60/327,298, filed Oct. 9, 2001, by Sala et al., entitled "A Synchronization Method to Support Voice Traffic with Minimum Latency," incorporated herein by reference.

CROSS-REFERENCE TO RELATED APPLICATIONS

The following U.S. patent applications have a common assignee and contain some common disclosure:

"Cable Modem with Sample and Packet Synchronization," U.S. patent application Ser. No. 09/501,850, by Rabenko et al., filed Feb. 10, 2000, incorporated herein by reference as though set forth in its entirety;

"Cable Modem with Sample and Packet Synchronization," U.S. patent application Ser. No. 09/501,892, by Rabenko et al., filed Feb. 10, 2000, incorporated herein by reference as though set forth in its entirety; and "Voice Architecture for Transmission Over a Shared, Contention Based Medium," U.S. patent application Ser. No. 09/785,020, by Gummalla, et al., filed Feb. 15, 2001, incorporated herein by reference as though set forth in its entirety.

BACKGROUND OF THE INVENTION

1. Field of the Invention

The present invention relates generally to communications networking, and more specifically, to trafficking packets in a communications network.

2. Related Art

Architects of communications networks continuously seek to achieve an optimal balance among various network characteristics. Such characteristics include bandwidth demand and quality of service parameters, such as latency, loss, or priority. For example, data-over-cable networks are expanding the variety of services traditionally provided to subscribers. In addition to television broadcasts, cable providers are offering telephony, messaging, and Internet services. As a result, additional bandwidth is needed to support the timely delivery of these services.

Moreover, traditional cable broadcasts primarily require one-way communications from a cable service provider to a subscriber's home. As interactive or personal television services and other nontraditional cable services continue to be offered, communications media used to support one-way communications must now contend with an increased demand for bi-directional communications.

In a conventional cable television communications network, a communications device (such as a cable modem) requests bandwidth from a headend device prior to transmitting data to its destination. The headend device allocates bandwidth to the communications device based on availability and the competing demands from other communications devices. Typically, bandwidth is available to transmit signals downstream to the communications device. However in the upstream, bandwidth is more limited and must be arbitrated among the competing communications devices.

Depending on the type of service being hosted by the communications device, some communication devices or their services are granted higher priority over others. For example, telephony is less tolerant of latency, jitter, and loss than a data messaging service. Although some degree of latency and loss may be tolerated by data services, such latency and loss can be problematic to voice scheduling. Therefore, methods are needed to permit high priority services to operate with minimum latency.

During voice communications, calls come and go independently of each other. In addition, if activity detection is used, silence and active periods during different calls also occur independently. Hence, the number of voice calls active in a given time period can frequently change. This means that grant size varies accordingly. These dynamics translate to the transmission time of a given call may be at the beginning of a grant in some periods and at the end of the grant in others. Hence, a call can suffer a jitter delay of up to the maximum grant size. This jitter delay, also called concatenation jitter, can be limited to a given value by limiting the number of voice calls that are concatenated in the same grant transmission. If more calls need to be supported, the calls can be grouped in separate grants assigned to the same, for example, cable modem. In this case, system efficiency is compromised for a better jitter bound (i.e., less variability in grant arrival).

Therefore, a method and system are needed to address the above problems.

SUMMARY OF THE INVENTION

The present invention solves the above problems by providing a method, system, and computer program product for conveying and maintaining synchronization information in an asynchronous communications network.

A supervisory node (such as, a cable modem termination system (CMTS) for a headend controller) communicates a synchronization timing reference to a plurality of remote nodes (such as, a cable modem). The synchronization timing reference is communicated during the setup process for a session (e.g., call), and the remote nodes use the synchronization timing reference to ensure that a packet is ready to be transmitted when a grant arrives.

In an embodiment, a remote node (e.g., cable modem) transmits jitter constraints to the supervisory node (e.g., CMTS) during a session setup. The supervisory node uses the jitter constraints to establish period/phase boundaries for servicing a session (e.g., call). The beginning of the period/phase boundaries serves as the synchronization timing reference. Therefore, the setup jitter constraints are used indirectly to explicitly communicate a synchronization timing reference.

Although the timing reference is set at the beginning of a phase/period boundary, the present invention also provides methodologies and techniques for specifying when the boundary begins. This time value is based on the expected arrival time of a grant, and is referred to as the synchronization timing reference value. For instance, supervisory node decides the grant allocation when it receives a request for a new session (e.g., call). At confirmation of the request, supervisory node specifies, for example, a minislot corresponding to a boundary of a phase "$ms_0$." The specified minislot is the initial grant, and serves as the synchronization timing reference value. The initial grant is announced with sufficient time for the recipient remote node to prepare the first burst.

Various embodiments are provided for the remote nodes to implicitly or explicitly determine the synchronization timing reference value "$ms_0$" from an exchange with the supervisory node. In an embodiment, the announcement of the first grant is used as an explicit indication of the synchronization timing reference value. In another embodiment, the synchronization timing reference value is inferred if a remote node receives contiguous voice grants meeting certain conditions. In an embodiment implementing periodic scheduling, the actual arrival of the first grant is used to infer the synchronization timing reference value.

After the synchronization timing reference value is determined, the packetization start time "$ms_0 - t_A$" is computed and the packetization process commences at the established time. In an embodiment, the present invention enables the synchronization timing reference value and/or the periodicity to be modified if network conditions indicate that packetization and burst operations are out-of-synchronization. Otherwise, once the synchronization timing reference has been established, it is not altered by subsequent grants.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

FIGS. 3(a), 3(b), 3(c), and 3(d) illustrate an example voice stream useful for implementing the present invention.

FIGS. 4(a), 4(b), 4(c), and 4(d) illustrate an example phase schedule useful for implementing the present inventions.

Figure 5:
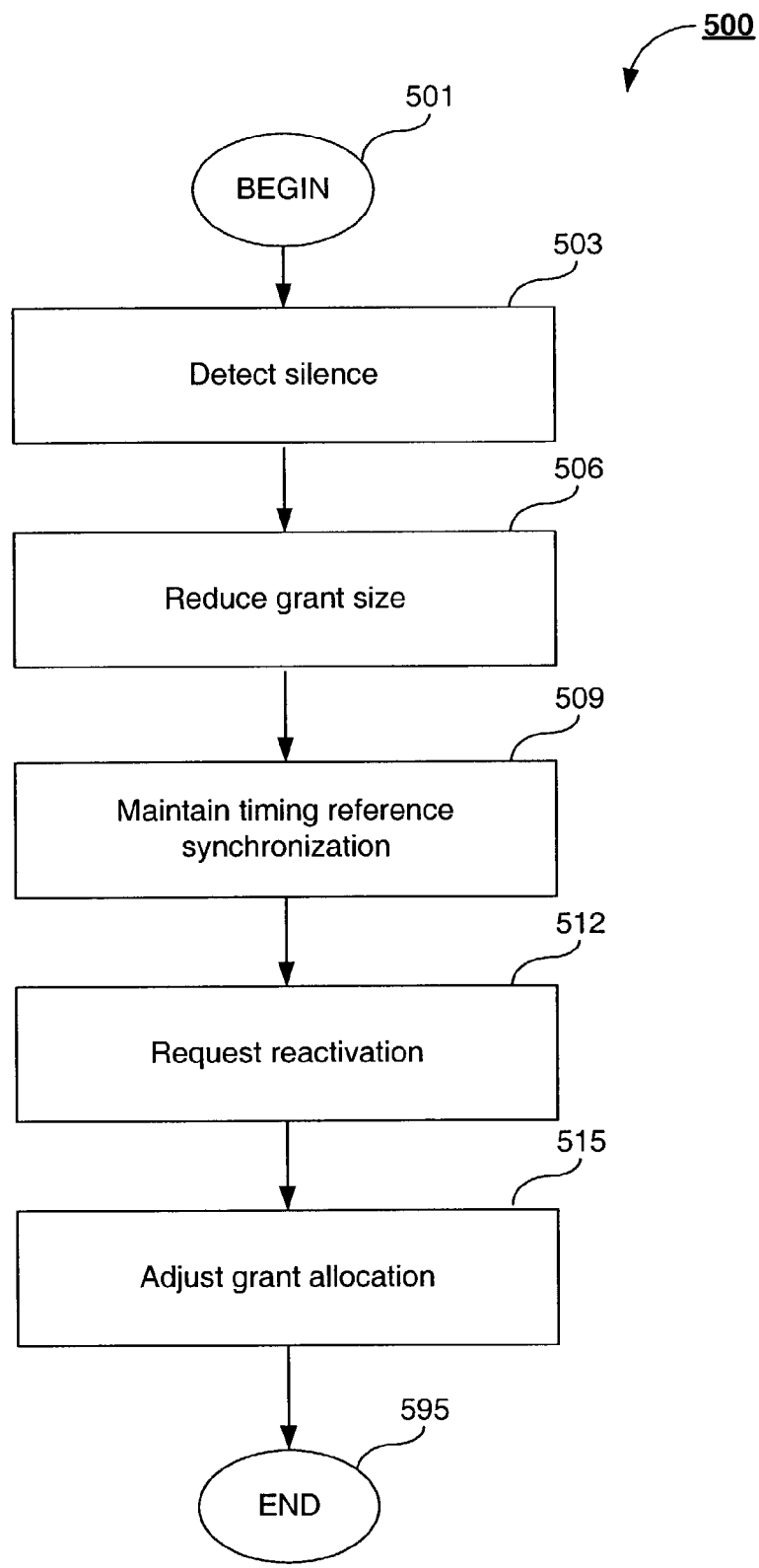

FIG. 5 illustrates an operational flow for modulating a packetization timing reference for silence according to an embodiment of the present invention.

Figure 6:
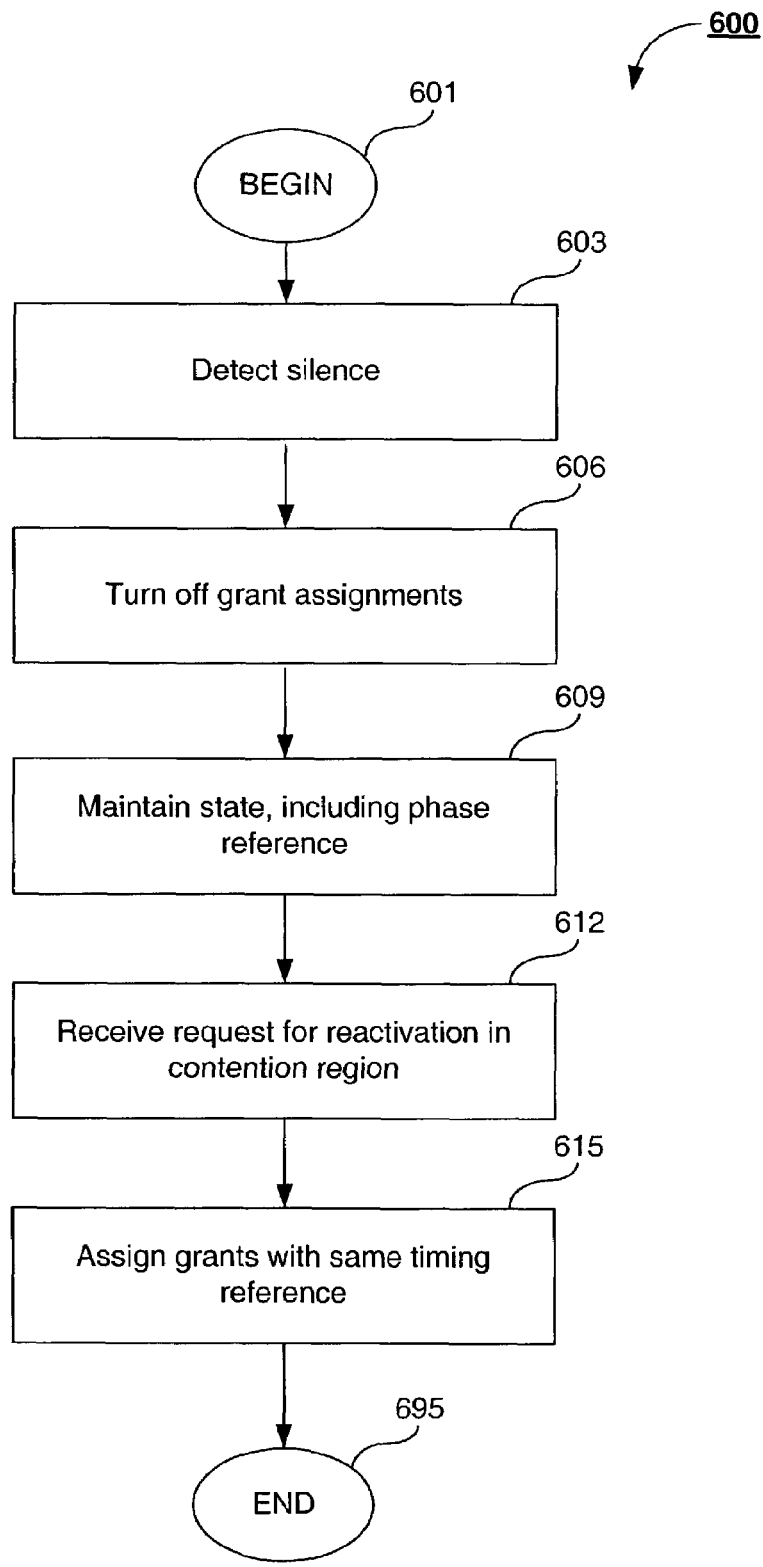

FIG. 6 illustrates an operational flow for modulating a packetization timing reference for silence according to another embodiment of the present invention.

Figure 7:
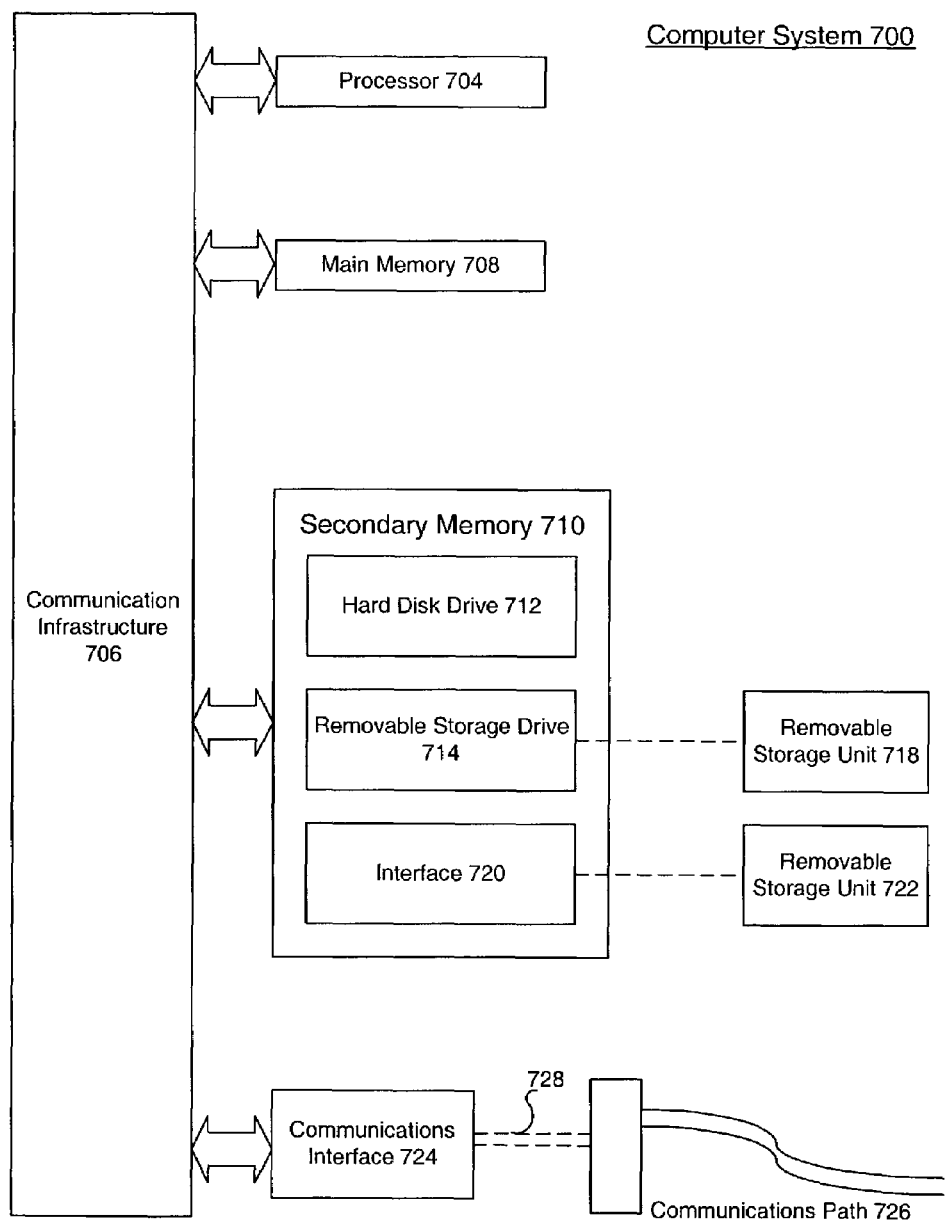

FIG. 7 illustrates an example computer system useful for implementing the present invention.

DETAILED DESCRIPTION OF THE INVENTION

Table of Contents

I. Introduction

II. System Overview

III. Overview of Synchronization Timing Reference

IV. Periodicity for Synchronization

V. Maintaining Synchronization during Silence

VI. Adjusting System Parameters

VII. Exemplary System Implementation

I. Introduction

The method, system, and computer program product of the present invention convey and maintain synchronization information within a communications network. A supervisory communications node (such as, a cable modem termination system (CMTS) for a headend controller) communicates a synchronization timing reference to a plurality of remote communications nodes (such as, a cable modem). The remote communications nodes use the synchronization timing reference to synchronize their respective packetization and burst operations. Such synchronization ensures that a packet is ready for transmission when a grant arrives, and therefore, improves overall delay performance.

As such, the present invention includes various methodologies and/or techniques for providing synchronization information to ensure that packets are ready for transmission at the arrival of a grant. The present invention can be implemented with periodic and general schedulers. In an embodiment, the scheduler for the supervisory communications node generates grants on a periodic basis. An example of a periodic scheduler and protocol used by cable systems to allocate bandwidth are described in the Data Over Cable System Interface Specification (DOCSIS) for governing cable communications.

However, the present invention also supports schedulers that generate grants on a regular, but not periodic, basis. Examples of a non-periodic scheduler are described in the "Propane™ Specification," version May 18, 2000, available from Broadcom Corporation, (hereinafter referred to as "the Propane™ specification"). The disclosure of the Propane™ specification is incorporated herein by reference in its entirety. Other examples of a non-periodic scheduler are described in the patent application entitled "Voice Architecture for Transmission Over a Shared, Contention Based Medium" (U.S. patent application Ser. No. 09/785,020), which is incorporated herein by reference in its entirety.

The schedulers described in the Propane™ specification and patent application Ser. No. 09/785,020 both are provided as examples of non-periodic schedulers since their scheduling algorithms are not standardized. However, the present invention is directed more specifically to a synchronization process and general synchronization signaling that can be used with most schedulers.

II. System Overview

Figure 1:
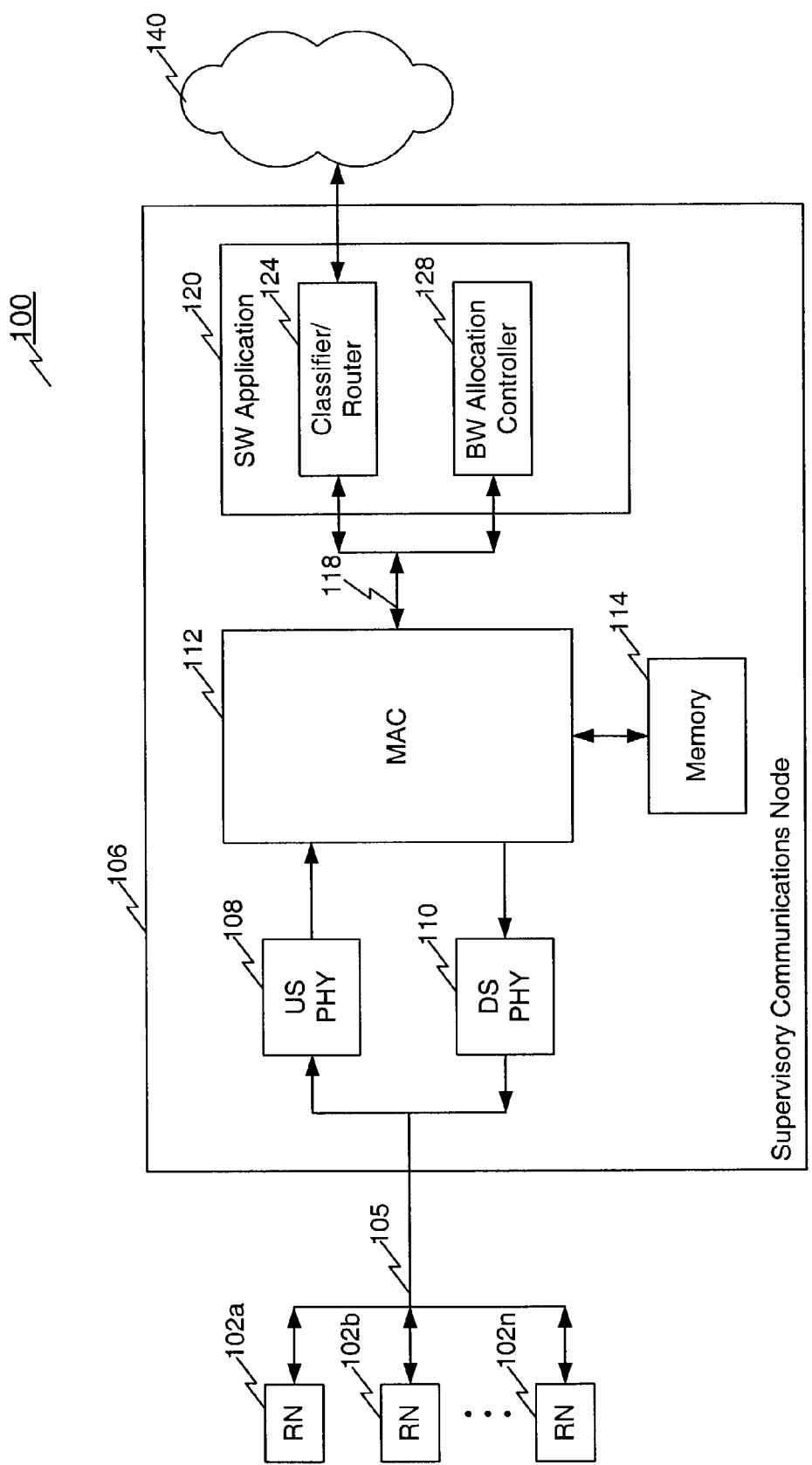
FIG. 1 illustrates a voice and data communications management system according to an embodiment of the present invention.

FIG. 1 illustrates a voice and data communications management system 100 according to embodiments of the present invention. System 100 includes a supervisory communications node 106 and one or more widely distributed remote communications nodes 102a-102n (collectively referred to as "remote communications nodes 102"). System 100 can be implemented in any multimedia distribution network. Furthermore, it should be understood that the method, system, and computer program product of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. In an embodiment, supervisory communications node 106 is a component of a headend controller for a cable communications network. As such, supervisory communication node 106 is a cable modem termination system (CMTS) or a part thereof. In an embodiment, at least one remote communications node 102 is a cable modem or a part thereof. In another embodiment, at least one remote communications node 102 is a component of a television set-top box.

As part of a cable modem, remote communications node 102 is configurable to host one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic therefrom. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment having multiple SIDs assigned to a single remote communications node 102, a primary SID or remote node identifier (RNID) is used to identify the remote communications node 102 or a general flow from the remote communications node 102, and a service class identifier (SCID) is used to specify a particular flow, service, or quality of service.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 105. As shown in FIG. 1, internodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, twisted pair, coaxial, hybrid fiber-coaxial (HFC), or the like), radio, microwave, free-space optic, and/or any other form or method of transmission.

All communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (including IP datagrams), voice packets, control messages, and/or the like. In an embodiment, the downstream is formatted with a motion picture expert group (MPEG) transmission convergence sublayer. However, the present invention can be configured to support other data formats as would be apparent to one skilled in the relevant art(s). In an embodiment, supervisory communications node 106 implements time division multiplexing (TDM) to transmit continuous point-to-multipoint signals in the downstream. However, the present invention can be configured to support other transmission modulation standards, including, but not limited to, Synchronous Code Division Multiple Access (S-CDMA), as would be apparent to one skilled in the relevant art(s).

The upstream represents all communications from remote communications nodes 102 towards supervisory communications node 106. In an embodiment, the upstream is divided into one or more upstream channels. Each upstream channel carries bursts of packets from remote communications nodes 102 to supervisory communications node 106. In the upstream, each frequency channel is broken into multiple assignable slots, and remote communications nodes 102 send a time division multiple access (TDMA) burst signal in an assigned slot. Again, the present invention can be configured to support other transmission modulation standards (such as, SCDMA or the like) as would be apparent to one skilled in the relevant art(s).

As shown in FIG. 1, embodiments of supervisory communications node 106 include an upstream demodulator physical interface (US PHY) 108, a downstream modulator physical interface (DS PHY) 110, a media access controller (MAC) 112, a memory 114 and a software application 120. US PHY 108 forms the physical layer interface between supervisory communications node 106 and the upstream channel(s) of internodal infrastructure 105. Hence, all bursts from remote communications nodes 102 are received at US PHY 108. US PHY 108 processes the bursts to decompress and/or extract voice, data, requests, and/or the like from remote communications nodes 102.

Conversely, DS PHY 110 forms the physical layer interface between supervisory communications node 106 and the downstream channel(s) of internodal infrastructure 105. Hence, voice, data (including television or radio signals) and/or control messages that are destined for one or more remote communications nodes 102 are collected at DS PHY 110 and transmitted to the respective remote communications nodes 102. DS PHY 110 compresses and/or formats the information for downstream transmission.

MAC 112 receives the upstream signals from US PHY 108, or provides the downstream signals to DS PHY 110, as appropriate. MAC 112 operates as the lower sublayer of the data link layer of supervisory communications node 106. MAC 112 performs a variety of lower level data link layer protocol processing which includes, but is not limited to, fragmentation, concatenation, and/or error checking for signals transported over the physical layer. In an embodiment, the protocol processes are defined by the Data Over Cable System Interface Specification (DOCSIS) for governing cable communications. The DOCSIS protocol processing includes, but is not limited to, interfacing with US PHY 108 and DS PHY 110, encrypting and decrypting data, packet deconcatenation, fragment reassembly, storing packet data in queues, and/or DMA functions to exchange data with memory 114. Although the present invention is described in reference to DOCSIS protocol processing, it should be understood that the present invention is intended to be inclusive of other types of communication protocols governing multimedia distribution networks. Such protocols include the Propane™ advanced transport technology for cable systems that is available from Broadcom Corporation (Irvine, Calif.), and like protocols for cable systems.

Memory 114 interacts with MAC 112 to store the signals in the appropriate output priority queue as they are processed and prioritized by MAC 112. Memory 114 also stores various auxiliary data used to support the processing activities. Such auxiliary data includes security protocol data, identifiers, rules, policies and/or the like, as described in greater details below.

MAC 112 is connected to software application 120 over bus 118, which is a conventional bi-directional bus. Software application 120 operates on one or more processors to receive control messages, voice and/or data from MAC 112, and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN) or wide area networks (WAN), such as an organization's intranet, local internets, the global-based Internet (including the World Wide Web (WWW)), virtual private networks, or the like. As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, or the like.

III. Overview of Synchronization Timing Reference

As described above with reference to FIG. 1, MAC 112 interacts with software application 120 to allocate and arbitrate upstream bandwidth among a plurality of remote communications nodes 102. MAC 112 can either reserve specific regions (e.g., minislots) to a designated remote communications node 102, or assign contention regions (e.g., contention minislots) for one or more remote communications nodes to use when they compete for bandwidth. Bandwidth assignments are specified in grant times, and hence, are referred to as grants. Upon receipt of a grant, remote communications node 102 assembles and transmits voice, data or control packets in an upstream burst.

The present invention provides a mechanism that synchronizes these two operations, namely packetization and burst operations. The present invention further controls and minimizes any delay between when a packet is ready for transmission and the arrival of a grant for transmitting the packet in a burst. A synchronization signal enables remote communications node 102 to start the packet generation process and mitigate burst delays.

Figure 2:
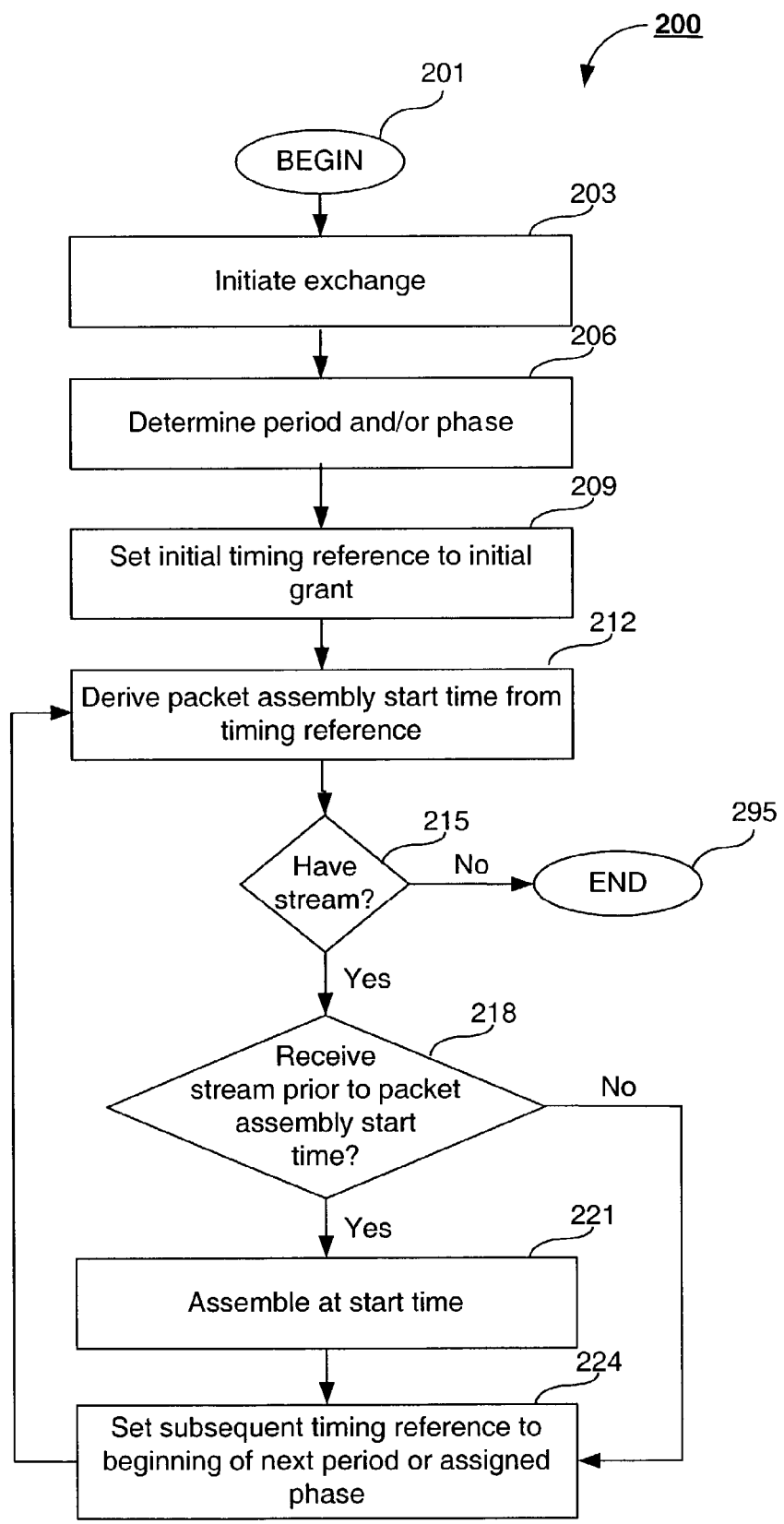
FIG. 2 illustrates an operational flow for establishing a packetization timing reference according to an embodiment of the present invention.
Figures 3A, 3B, 3C, 3D:
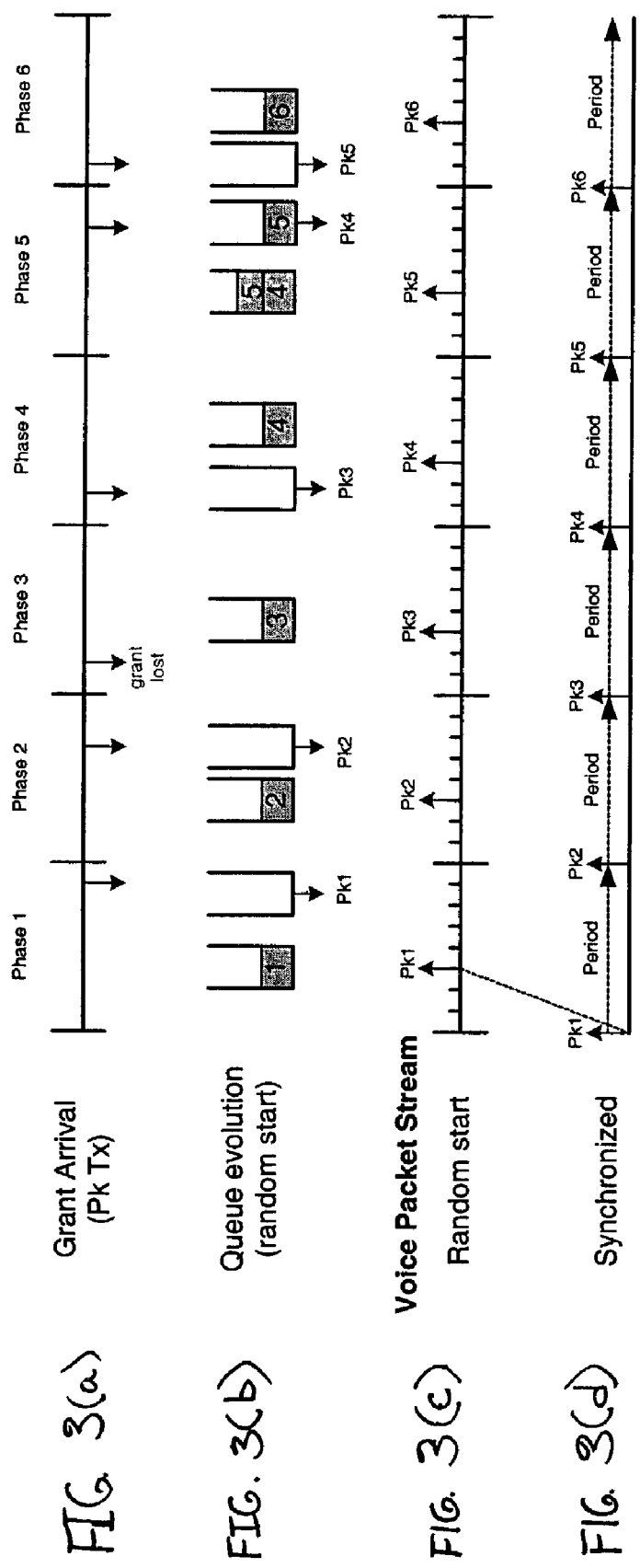

Referring to FIG. 2, flowchart 200 represents the general operational flow of an embodiment of the present invention. More specifically, flowchart 200 shows an example of a control flow for providing a synchronization signal or timing reference that mitigates burst delays.

The control flow of flowchart 200 begins at step 201 and passes immediately to step 203. At step 203, a remote communications node 102 receives a request to begin a session from a subscriber end user. The session can be a telephone call or some other type of high priority service. Remote communications node 102 forwards the request to supervisory communications node 106. Upon receipt, supervisory communications node 106 prepares and sends setup parameters to remote communications node 102. In an embodiment, the setup parameters are defined by the DOCSIS protocol. However other protocols can be implemented with the present invention as described above. The setup parameters provide instructions for governing the communication exchange between remote communications node 102 and supervisory communications node 106 during the course of the session. The setup parameters include current time in, for example, minislots.

At step 206, the setup parameters are processed. One setup parameter is the length or duration of periodicity. A period specifies the time frame for servicing a session (for example, a call) with an end user. In an embodiment, remote communications node 102 transmits jitter constraints to supervisory node 106 during session setup, and the jitter constraints are used to establish the period. If multiple end users are engaging in a session with supervisory communications node 106, remote communications node 102 sends a transmittal of voice, data and/or control messages from each end user in each period. Therefore at the conclusion of a period, an opportunity is provided for each end user to send a transmission.

In an embodiment, the period is segmented into subperiods or phases. The duration of a phase corresponds to the maximum jitter bound (i.e., variability in grant arrival). Likewise, the number of phases depends on the jitter constraints. A zero jitter service is achieved when the phase size is set to one slot (i.e., one period).

At step 209, remote communications node 102 sets or derives a timing reference to synchronize packetization. The synchronization ensures that a packet is ready for transmission at the stipulated timing reference value. The timing reference is set to occur at the beginning of the first period, as determined at step 206. Hence if multiple phases are established per period, the phase boundary for each phase serves as a timing reference used to synchronize packet assembly for that phase.

More specifically, the jitter constraints indirectly are used to explicitly communicate a synchronization timing reference to remote communications node 102. In general, all schedulers must guarantee a jitter bound, and the reference used to keep track of this bound is the reference that is used as the synchronization timing reference. Accordingly, the timing reference is the timing boundary of the phases of the sessions (e.g., call). However, although the phase/period boundaries are derived from the setup parameters (namely jitter constraints), it is imperative to be able to predict, with reasonable certainty, the time at which a grant is expected to arrive. This expected arrival time is referred to as the timing reference value. It should be noted that the actual arrival time of the grant could occur at any time within the beginning and end boundaries of a phase, as discussed in greater detail below.

The present invention makes available various methodologies and/or techniques to convey and maintain synchronization information (i.e., timing reference value) in remote communications node 102 (e.g., cable modem). In an embodiment, supervisory communications node 106 (e.g., the CMTS) explicitly communicates the timing reference value to remote communications node 106 as part of the session setup process. For instance, supervisory communications node 106 decides the grant allocation when it receives the request for a new session (e.g., call). At confirmation of the request, supervisory communications node 106 specifies, for example, a minislot corresponding to a boundary of a phase "$ms_0$." The specified minislot is the initial grant. The initial grant is announced with sufficient time for the recipient remote communication node 102 to prepare the first burst. Otherwise if the grant is not announced with sufficient preparation time, as described in further detail below with respect to step 218, the recipient node 102 uses the grant to prepare a burst for the following phase.

Explicitly communicating the timing reference value in the initial grant is one embodiment for conveying and maintaining the synchronization information. In another embodiment, synchronization information is inferred from communications with supervisory communications node 106. For instance, remote communications node 102 identifies the beginning of a phase by checking all voice grants in the phase. The phase boundary is inferred if the following three conditions are met. First, the voice grants are contiguous. Second, the voice region always starts at the beginning of a phase. Finally, there is at least a data packet at the end of each phase. Several scheduling decisions may not satisfy these conditions. For example, in order to reduce the fragmentation of the upstream channel, one would like the voice regions to be as contiguous as possible. Hence, phases could be totally filled before calls are allocated in the next phase. This condition would also prevent using floating voice region boundaries or filling the voice regions in alternative order from the beginning to the end and from the end to the beginning. Again, these policies are intended to reduce fragmentation.

In another embodiment, the actual arrival of the first grant is used to set the timing reference value. This embodiment is effective only if the scheduler (within supervisory communications node 106) produces grants at exact periods. This represents an alternative method of implicit synchronization that avoids an explicit communication exchange between supervisory communication node 106 and remote communications node 102 to set the timing reference value. However, the implicit synchronization of this embodiment would not be as effective, as the above embodiments, for non-periodic or general schedulers (such as, a Propane™-compliant scheduler).

The above embodiments for conveying and maintaining synchronization information are provided by way of example and not limitation. Other methodologies and/or techniques are available. As described, the synchronization information is used to set a timing reference value to specify, for example, a minislot corresponding to a boundary of a phase "$ms_0$." Once the timing reference value is set, remote communications node 102 does not re-synchronize with the arrival of future grants.

At step 212, remote communications node 102 determines the packet assembly start time "$ms_0$-$t_A$" for the first phase/period. In other words, remote communications node 102 synchronizes the packetization process to time "$ms_0$-$t_A$" where $t_A$ is the packet assembly time. The packet assembly time is measured as the sum of all processing times needed to get the packet ready in the queue. The synchronization for concatenated voice calls, for example, must consider the time it takes to generate all packets so that the grant does not arrive earlier than when the last packet is ready. This timing requires generating all packets in time to be transmitted at the beginning of a phase.

In an embodiment, remote communications node 102 includes a digital signal processor (DSP) that performs the packetization. If only one call, for example, is handled by the DSP, the packet assembly start time corresponds to the phase time "$ms_0$" minus the processing time "$t_A$" for generating a packet. If "n" calls are handled with the same DSP, this subtraction is "n" times larger (i.e., "$(n)(t_A)$"). Therefore, the packet assembly time is the amount of time required to prepare a packet (e.g., voice packet). As such, the packet assembly time $t_A$ is subtracted from the timing reference (i.e., "$ms_0$") to produce the value "$ms_0$-$t_A$" representing the packet assembly start time. Accordingly, the packet assembly start time triggers remote communications node 102 to start assembling a packet, such that it is ready for transmission at the timing reference time value. The present invention is premised on each session (e.g., call) receiving a grant during every period, and the beginning of a period serves as the timing reference for synchronization.

At step 215, remote communications node 102 checks for a voice stream from the end user. If found, the control flow passes to step 218. At step 218, remote communications node 102 compares the current time with the packet assembly start time, and determines whether the packet assembly start time has expired. If the current voice stream (from step 215) is received after the expiration of the packet assembly start time, the control flow passes to step 224. Otherwise, the control flow passes to step 221 since the packet assembly start time has not elapsed.

At step 221, a voice stream is sampled and assembled into a packet. In an embodiment, the number of samples in a packet is fixed. Therefore, the stream of packets is periodic with the period being equal to the packetization interval. The larger the period (as defined at step 206), the larger the packet size. Compression mechanisms can be implemented to reduce the packet size, and maintain the packet size to a constant value. However, if compression is implemented, the compression time is reflected in the processing time "$t_A$" to ensure that the packet is ready for transmission at the timing reference value.

Upon completion of packet assembly, the voice packet is ready for transmission. Since the timing reference is set at a time value that designates the completion of packet assembly, the assembled voice packet is ready for transmission at the beginning of the period. After the packet has been assembled, the control flow passes to step 224.

At step 224, the timing reference for the next burst is set. Remote communications node 102 determines the timing reference value "$ms_0$" that specifies, for example, a minislot corresponding to a boundary of the next period or phase. As discussed, the timing reference value is not re-synchronized to the next grant, but rather adjusted to the beginning boundary of the next period or phase. If the phase is set to one slot, the timing reference is set at the beginning of the next period. If more than one phase has been established (as discussed at step 206), the timing reference is set to the beginning of the phase boundary for the next phase.

The control flow, then, passes back to step 212, and the packet assembly start time for the next period or phase is set for the designated session. Furthermore, referring back to step 218, if the packet assembly start time has expired, the present invention determines the timing reference for the next phase to calculate a new packet assembly start time.

Hence, the process is repeated until the voice stream discontinues at step 215. When no more voice sampling is required (because the voice stream has discontinued), the control flow ends as indicated at step 295.

As demonstrated by the control flow of FIG. 2, the present invention provides a timing reference for ensuring that a packet is assembled and ready for transmission at the beginning of a designated period or phase boundary. This ensures that the packet is ready when a grant is received. This can be illustrated with reference to FIGS. 3(*a*)-3(*d*).

FIGS. 3(*a*)-3(*d*) show an example using phase-based scheduling to provide grants to a cable modem (i.e., remote communications node 102). FIG. 3(*a*) shows grant time arrivals at a cable modem (i.e., remote communications node 102) for each phase (shown as Phase 1-6), and FIG. 3(*c*) shows the periodic stream of voice packets. It is assumed that no synchronization exists between the grant time arrivals shown in FIG. 3(*a*) and the periodic stream shown in FIG. 3(*c*). Hence, the voice stream is randomly started to a particular minislot.

The evolution of the queue, as packets are generated and transmitted in grants, is shown in FIG. 3(*b*). The random start of the packet generation (shown in FIG. 3(*c*)) is such that the packet is generated before the first grant arrives (shown in FIG. 3(*a*)). Hence, as shown in FIG. 3(*b*), Phase 1 and Phase 2 transmit the packet that has been generated at this same phase. Since the grant period is not constant, the grant at Phase 3 arrives before the packet is generated. Hence, this grant is left empty. The packet generated in phase 3 is then served at the following phase 4. From this point on, a packet generated in a phase is served in the following phase. If a grant arrives after the packet is generated, the queue must be able to hold two packets (as shown in Phase 5). On the other hand, if a grant arrives before the packet of the same phase is generated, as shown in Phase 6, the queue just holds one packet.

The present invention provides a synchronization timing reference that mitigates loss of any grant and minimizes queuing delay. This is achieved if the voice stream is synchronized with the phase boundaries as shown in FIG. 3(*d*). This synchronization guarantees that grants are not lost because a packet is always ready for a grant in a phase regardless of the time during the phase that the grant arrives. In addition, the time value at the phase boundary is the latest time at which the packet can be generated in order not to miss the grant. Therefore, the present invention enables minimum latency for this environment. This can be easily seen in a queuing evolution where the queue alternates between having a packet and being empty (not shown in FIGS. 3(*a*)-3(*d*)). Note that the buffer provisioning for the above embodiments should allocate sufficient space to store a packet per call.

Another important characteristic to highlight is that in order to synchronize the stream to set the timing reference at the phase boundary, only the starting time for the first packet is needed. Subsequent packets fall in the correct timing by the inherent periodicity of the packetization process (see FIG. 3(*d*)). Hence, a cable modem (i.e., remote communications node 102) must only know, or infer, from its CMTS (i.e., supervisory communications node 106) a starting point value (i.e., timing reference value) instead of maintaining a full framing synchronization.

A variation of the example shown in FIGS. 3(*a*)-3(*d*) involves a scheme having the grant process also being a periodic stream. An advantage of this alternative embodiment is that the phase boundary is equal to the grant arrival. As described above with reference to step 209 of FIG. 2, for periodic scheduling, the grant arrival event can be used as a synchronization signal to the packetization process. However, this type of synchronization timing reference is not general enough for a phase-based scheduler. In such a case, the present invention provides a more general approach for inferring the timing reference, such as the approach described with reference to FIGS. 3(*a*)-3(*d*).

Generally speaking, packets are not transmitted until a corresponding grant is received. Hence, the overall delay performance can be improved if the packetization and burst operations are synchronized. As described herein, the present invention provides methodologies and/or techniques for providing synchronization information to ensure that packets are ready for transmission at the arrival of a grant.

The improvement resulting from the grant and packetization synchronization of the present invention is a reduction of latency. On average, the reduction is one-half of a packetization period, and the maximum reduction is one period.

IV. Periodicity for Synchronization

As discussed with reference to FIG. 2, the present invention sets the timing reference to start at the beginning of a period or phase. The periodicity and phase structure is determined from the session setup parameters provided by supervisory communications node 106 (e.g., a CMTS). FIGS. 4(*a*)-4(*d*) show examples for determining periodicity and/or phase structure from exchange setup parameters.

To balance competing demands for efficiency with the quality of service requirements within a communications network, voice transmission has very stringent jitter constraints. Nonetheless, voice transmission can tolerate a certain amount of end-to-end jitter and latency. In an embodiment, the scheduler for supervisory communications node 106 (e.g., CMTS) makes use of this jitter and latency budget to increase the concatenation opportunities and in turn improve the overall system efficiency. This is achieved by generating grants with certain regularity but avoiding the strong demands of an exact periodicity. The scheduler divides the packetization period into several phases and accepts a session (e.g., call) in a particular phase. The scheduler guarantees that each session (e.g., call) receives a grant during its phase. The duration of the phase corresponds to the maximum jitter bound. So the number of phases the scheduler operates with depends on the jitter constraints. Each session (e.g., call) in system 100 can potentially operate with a different number of phases. A zero jitter service can be achieved when the phase size is set to one slot. In this case, the grant comes with an exact periodicity.

Referring to FIGS. 4(*a*)-4(*b*), the network (e.g., system 100) has a 2.56 Mbps upstream capacity, sixteen byte minislot size (two hundred minislots frame size), and twenty bytes overhead per packet. Each call (i.e., session) is sixteen kbps with a ten milliseconds packetization interval. If all calls (i.e., sessions) belong to a different remote communications node 102 (e.g., cable modem), the network (i.e., system 100) can support a maximum of sixty-six calls (i.e., sessions).

Each call (i.e., session) must receive a grant at every period or frame as shown in FIG. 4(*a*). One way to guarantee this is by keeping a list of admitted calls (i.e., sessions) up to a maximum of sixty-six calls (i.e., sessions). FIG. 4(*b*) shows a snapshot of this approach assuming that there are forty calls (i.e., sessions) in the network (i.e., system 100) and all of them, except the last one admitted (shown as Call 40). The last call (i.e., session) finishes in the next frame. The grant for this call (i.e., session) is sent in the fortieth position in Frame 1 but finishes in the first position in Frame 2. This translates to a jitter delay equal to thirty-nine calls (i.e., sessions). As such, it can be seen that the maximum jitter delay a call (i.e., session) can suffer in the network (i.e., system 100) is equal to the packetization interval.

The jitter bound can be limited if the number of calls (i.e., sessions) admitted is controlled with sub-lists, each one controlling a separate part of the period. Each sub-period is called a phase. This is shown in FIG. 4(*c*). If the jitter bound is equal to 2.5 milliseconds, the frame is divided in four phases. Each frame has a separate list of calls (i.e., sessions) belonging to the phase. A phase in this case can support sixteen calls (i.e., sessions). Calls (i.e., sessions) are admitted based on a policy into phases. Call 40 has been admitted in Phase 3. Call 40 is served at the beginning of the Phase 3 in Frame 2. Note that the complexity of this example has marginally increased compared to the general one shown in FIG. 4(b).

The example shown in FIG. 4(a) is a particular phase-based algorithm where the phase size is set equal to the maximum, that is, the packetization interval. FIG. 4(d) shows the other extreme of the selection of the phase size where it is equal to its minimum value, a single call (i.e., session). In this case, Call 40 is served at exactly the same time in the second frame of the example.

It should be noted that the scheduling algorithm does not necessarily guarantee an exact time for the grants to arrive. However, a certain regularity can be inferred by the specified jitter bound. Thus, the present invention provides a mechanism for guaranteeing the packet is always ready when the grant arrives. The minimum delay synchronization mechanism guarantees that the packetization process generates the periodic packets so that they wait in the queue the minimum amount of time just to buffer this uncertainty of the grant arrival.

V. Maintaining Synchronization during Silence

Referring back to FIG. 2, the control flow of flowchart 200 ends if the voice stream discontinues or is interrupted for a significant period of time. However, in an embodiment, the present invention is able to distinguish between the end of a session (e.g., call) and periods of silence within a session. During a silence period, a component of remote communications node 102 detects that no information is available to be sent, and stops generating packets. Although no packets are generated, remote communications node 102 decides, at every period, whether to generate a packet or not. Regardless of the outcome of the decision process, the timing reference does not change. However, the present invention enables supervisory communications node 106 to take several actions during silence periods. One example is shown in FIG. 5.

Referring to FIG. 5, flowchart 500 represents the general operational flow of an embodiment of the present invention. More specifically, flowchart 500 shows an example of a control flow for sustaining the synchronization timing reference of the present invention during silence periods.

The control flow of flowchart 500 begins at step 501 and passes immediately to step 503. At step 503, supervisory communications node 106 (e.g., CMTS) detects a silence period during a session (e.g., call). At step 506, supervisory communications node 106 reduces the grant size. Examples for reducing grant size are described in the DOCSIS specification for cable communications. At step 509, supervisory communications node 106 maintains the timing reference synchronization at both ends since supervisory communications node 106 (e.g., CMTS) and remote communications node 102 (e.g., cable modem) continue to operate with the same timing.

At step 512, the end user sends a new voice stream when the session (e.g., call) goes active again. Remote communications node 102 uses a grant to send a request to reactivate the session (e.g., call). At step 515, supervisory communications node 106 adjusts the grant allocation, if necessary, to accommodate for the additional voice stream. After the grant allocation has been adjusted for future servicing, the control flow ends as indicated at step 595.

In the above example, the grant size is reduced but the timing reference is maintained. Hence, the change of state from active to silent, or vice versa, does not necessitate resynchronization of the timing reference. Alternatively, the present invention can also be implemented in an environment that reduces the grant size to zero. Referring to FIG. 6, flowchart 600 represents the general operational flow of another embodiment of the present invention. More specifically, flowchart 600 shows another example of a control flow for sustaining the synchronization timing reference of the present invention.

The control flow of flowchart 600 begins at step 601 and passes immediately to step 603. At step 603, supervisory communications node 106 (e.g., CMTS) detects a silence period. At step 606, supervisory communications node 106 turns-off grant assignments for the silent session (e.g., call). The Propane™ specification describes examples for stopping the generation of grants during silence periods.

Although grant generation has been suspended or terminated, at step 609, supervisory communications node 106 maintains the state, including phase reference. Unlike step 509 of FIG. 5, in embodiments of step 609, there is the potential of desynchronizing the two processes (i.e., packetization at remote communications node 102 and grant assignment at supervisory communications node 106), depending on the design of the scheduler for supervisory communications node 106.

At step 612, the session (e.g., call) goes active again. Supervisory communications node 106 receives a request for reactivation in a contention minislot specifically reserved for voice traffic. At step 615, supervisory communications node 106 assigns grants with the same timing reference. Since the scheduler for supervisory communications node 106 maintains the same state when a session goes silent, supervisory communications node 106 reactivates the same state when the session goes active again. In other words, the phase assignment (i.e., the timing reference for the synchronization) has not changed. As a result, supervisory communications node 106 avoids resynchronization of the timing reference. After the grant assignment has been transmitted to remote communications node 102, the control flow ends as indicated at step 695.

As described with reference to FIG. 5 and FIG. 6, the present invention enables a change of state in a voice call, for example, without having to resynchronize the timing reference. The embodiments described above have been provided by way of example, and not limitation. As such, other protocols can be implemented to preserve the synchronization timing reference and avoid resynchronization, as would be apparent to one skilled in the relevant art(s). The present invention permits the packetization process to provide an indication that a session is going active as soon as the first sample of the active period is detected. This gives additional time to reactivate the grant stream before the first packet of this active period is generated. This allows allocating fewer numbers of contention regions (e.g., minislots) reserved for voice traffic. The time gain is half a packetization interval on average. However, this time can be increased to a full period if the packetization process resynchronizes to the beginning of the active period.

VI. Adjusting System Parameters

As described in the embodiments above, the present invention does not require remote communications nodes 102 to resynchronize the timing reference once it is originally established. Referring back to FIG. 2, the initial timing reference is implicitly or explicitly set during the session setup process. In an embodiment, the initial timing reference is derived from the initial grant, and used to determine the packet assembly start time for the initial burst. The timing references for subsequent packetization are based on the phase boundaries as determined from the initial timing reference. In other words, the expected or actual arrival of future grants is not used to adjust the timing reference.

However as network conditions mature, there may arise a need to adjust or resynchronize the timing reference. For example, packet loss or unused grants are indications that the timing reference may be out-of-synchronization. If the scheduler within supervisory communications node 106 over allocates bandwidth for a session, remote communications nodes 102 will lack sufficient data to fill the grants. After several periods, the system will detect grants being left empty. On the other hand, if the scheduler under allocates bandwidth, remote communications nodes 102 may overwrite or discard packets due to insufficient storage capacity. Consequently, this will result in packet loss after a certain period of time. Other network conditions can also trigger a need for resynchronization of the timing reference.

Should these events occur, the present invention permits the timing reference value to be resynchronized. In an embodiment, steps 209-295 (described with reference to FIG. 2) are repeated to reset the timing reference value. Thus, the period/phase structure (determined at step 206) does not change. However, the affected remote communications node(s) 102 implicitly or explicitly (depending on the embodiment) determines a new initial timing reference value "$ms_0$" from communications with supervisory communications node 106. For instance, in an embodiment, the announcement of the next grant is used as an explicit indication of the new timing reference value. In another embodiment, the new timing reference value is inferred if remote communications node 102 receives contiguous voice grants meeting the three conditions described in step 209 above. In an embodiment implementing periodic scheduling, the actual arrival of the next grant is used to infer the new timing reference value. After the new timing reference value is determined, the packetization start time "$ms_0-t_A$" is computed and the resynchronized packetization process continues as described in steps 212-295.

Resynchronizing the timing reference, as described above, is originated at remote communications nodes 102 based on observations of maturing network conditions. However, supervisory communications node 106 also detects and considers network changes, including, but not limited to, packet loss, unused grants, etc. Accordingly, in an embodiment, supervisory communications node 106 is configured to adjust the session parameters if it detects a substantial degree of packet loss, unused grants, or other triggering events. For instance, a substantial degree of unused grants or packet loss is an indication that the phase and packetization time intervals are incompatible.

If, for example, the scheduler for supervisory communications node 106 assigns bandwidth at minislot granularity, it is likely that the grant mechanism within supervisory communications node 106 also operates at minislot granularity. However, the packetization process at remote communications nodes 102 operates with sample units that are used to specify a default period value. It is possible that the two time intervals (i.e., minislot used by supervisory communications node 106 and sample unit used by remote communications nodes 102) do not exactly match. A mismatch in the time intervals, and hence packet/grant generation rates, provokes a shift in the correspondence between packets and grants. This shift, if it is not corrected, may cancel out the latency savings achieved by the synchronization timing reference of the present invention.

If the time intervals are not matched, the scheduler at supervisory communications node 106 may over allocate bandwidth for a session (e.g., call). In other words, a grant period would be smaller than the packetization period. This results in a grant being left empty after several periods. On the other hand, if the scheduler under allocates bandwidth, this may result in packet loss after a certain period of time. Remote communications nodes 102 may start generating packets before grants are received. This increases the probability of packets being overwritten if the buffer size is inadequate.

Such events would trigger a signal to adjust the period/phase structure. Thus, in an embodiment, supervisory communications node 102 alters the phase structure to mitigate undesirable network conditions, such as packet loss, unused grants, etc. In an embodiment, the packetization interval is adjusted to be a multiple of the minislot unit. This results in matching the time intervals used at both ends (i.e., supervisory communications node 106 and remote communications nodes 102). In another embodiment, the scheduler at supervisory communications node 106 is configured to use sample units, which introduces finer granularity.

The detection of unused grants is one triggering event for adjusting the period/phase. However, supervisory communications node 102 will also adjust the period/phase if grant allocation is insufficient. For example, if a session is reactivated following a silence period (as described above), the original phase may not have enough bandwidth to support the reactivated session. Hence, in an embodiment, an additional mechanism is provided to reject the transfer from silence to re-activation. In another embodiment, the scheduler of supervisory communications node 106 adjusts the phase at which the session (e.g., call) was originally accepted. For instance, in an embodiment, supervisory communications node 106 uses the first packet (indicating re-activation) to infer a point for altering the period/phase structure. The point is determined by extracting the time of the first sample in the first packet. Hence this communication does not need an implicit communication between the two ends.

VII. Exemplary System Implementation

FIGS. 1-6 are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Additionally, the present invention can be implemented in one or more computer systems capable of carrying out the functionality described herein. Referring to FIG. 7, an example computer system 700 useful in implementing the present invention is shown. Various embodiments of the invention are described in terms of this example computer system 700. After reading this description, it will become apparent to one skilled in the relevant art(s) how to implement the invention using other computer systems and/or computer architectures.

The computer system 700 includes one or more processors, such as processor 704. Processor 704 can be a special purpose or a general purpose digital signal processor. Processor 704 is connected to a communication infrastructure 706 (e.g., a communications bus, crossover bar, or network).

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718 represents a floppy disk, magnetic tape, optical disk, etc. As will be appreciated, the removable storage unit 718 includes a computer usable storage medium having stored therein computer software (e.g., programs or other instructions) and/or data.

In alternative implementations, secondary memory 710 includes other similar means for allowing computer software and/or data to be loaded into computer system 700. Such means include, for example, a removable storage unit 722 and an interface 720. Examples of such means include a program cartridge and cartridge interface (such as that found in video game devices), a removable memory chip (such as, an EPROM or PROM) and associated socket, and other removable storage units 722 and interfaces 720 which allow software and data to be transferred from the removable storage unit 722 to computer system 700.

Computer system 700 can also include a communications interface 724. Communications interface 724 allows software and/or data to be transferred between computer system 700 and external devices. Examples of communications interface 724 include a modem, a network interface (such as an Ethernet card), a communications port, a PCMCIA slot and card, etc. Software and data transferred via communications interface 724 are in the form of signals 728 which can be electronic, electromagnetic, optical, or other signals capable of being received by communications interface 724. These signals 728 are provided to communications interface 724 via a communications path (i.e., channel) 726. Communications path 726 carries signals 728 and can be implemented using wire or cable, fiber optics, a phone line, a cellular phone link, an RF link, free-space optics, and/or other communications channels.

In this document, the terms "computer program medium" and "computer usable medium" are used to generally refer to media such as removable storage unit 718, removable storage unit 722, a hard disk installed in hard disk drive 712, and signals 728. These computer program products are means for providing software to computer system 700. The invention, in an embodiment, is directed to such computer program products.

Computer programs (also called computer control logic or computer readable program code) are stored in main memory 708 and/or secondary memory 710. Computer programs can also be received via communications interface 724. Such computer programs, when executed, enable the computer system 700 to implement the present invention as discussed herein. In particular, the computer programs, when executed, enable the processor 704 to implement the processes of the present invention, such as the method(s) implemented using remote communications nodes 102, supervisory communications node 102, and/or software application 120 described above, such as methods 200, 500, and/or 600, for example. Accordingly, such computer programs represent controllers of the computer system 700.

In an embodiment where the invention is implemented using software, the software can be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention should not be limited to transmissions between cable modems and headends. The present invention can be implemented in any multi-nodal communications environment governed by centralized nodes. The nodes include, but are not limited to, communication gateways, switches, routers, Internet access facilities, servers, personal computers, enhanced telephones, personal digital assistants (PDA), televisions, set-top boxes, or the like. Thus, the present invention should not be limited by any of the above-described exemplary embodiments, but should be defined only in accordance with the following claims and their equivalents.

What is claimed is:

1. A method for assembling a packet, comprising the steps of:
   determining a phase for servicing a subset of the one or more sessions;
   accessing a timing reference corresponding to an upcoming burst, wherein the timing reference is based upon the phase;
   determining a packet assembly time;
   deriving a start time for assembling a packet from the packet assembly time and the timing reference; and
   assembling a packet beginning at the start time.

2. The method of claim 1, wherein said accessing step further comprises the step of:
   receiving the timing reference from a Cable Modem Termination System (CMTS) scheduler.

3. The method of claim 1, wherein said accessing step further comprises the step of:
   receiving the timing reference from a setup exchange.

4. The method of claim 1, wherein said accessing step further comprises the step of:
   receiving the timing reference from jitter constraints.

5. The method of claim 1, further comprising the step of:
   setting the timing reference at the beginning of the period.

6. The method of claim 1, further comprising the steps of:
   setting the timing reference for the subset at the beginning of the phase.

7. A method for assembling a packet, comprising the steps of:
   establishing a period for servicing one or more sessions based on jitter constraints;
   determining a phase for servicing a subset of the one or more sessions;
   setting a timing reference from the phase;
   determining a packet assembly time;
   deriving a start time for assembling a packet from the packet assembly time and the timing reference; and
   assembling a packet beginning at the start time.

8. A method for assembling a packet, comprising the steps of:
  establishing a period for servicing one or more sessions;
  determining a phase for servicing a subset of the one or more sessions;
  setting a timing reference to occur prior to an expected arrival of a grant, wherein the timing reference is based upon the phase;
  determining a packet assembly time;
  deriving a start time for assembling a packet from the packet assembly time and the timing reference; and
  assembling a packet beginning at the start time.

9. A method for assembling a packet, comprising the steps of:
  accessing a period for servicing one or more sessions;
  determining a phase for servicing a subset of the one or more sessions;
  setting a timing reference at the beginning of the phase, wherein the timing reference is based upon the phase and the beginning of the period is determined from an initial grant announcement;
  determining a packet assembly time;
  deriving a start time for assembling a packet from the packet assembly time and the timing reference; and
  assembling a packet beginning at the start time.

10. The method of claim 9, further comprising the step of:
  resetting the timing reference in response to detecting packet loss or unused grants.

11. The method of claim 9, further comprising the step of:
  resetting the periodicity in response to detecting packet loss or unused grants.

12. The method of claim 9, further comprising the step of:
  maintaining the timing reference in response to detecting a silence period.

13. A system for assembling a packet, comprising:
  means for accessing a period for servicing one or more sessions;
  means for determining a phase for servicing a subset of the one or more sessions;
  means for setting a timing reference for the period, wherein the timing reference is based upon the phase;
  means for determining a packet assembly time;
  means for deriving a start time for assembling a packet from the packet assembly time and the timing reference;
  means for resetting the timing reference in response to detecting packet loss or unused grants; and
  means for assembling a packet beginning at the start time.

14. The system of claim 13, further comprising:
  means for resetting the periodicity in response to detecting packet loss or unused grants.

15. The system of claim 13, further comprising:
  means for maintaining the timing reference in response to detecting a silence period.

16. A computer program product comprising a computer useable medium having computer readable program code means embedded in said medium for causing an application program to execute on a computer that assembles a packet, comprising:
  first computer readable program code means for causing the computer to access a period for servicing one or more sessions;
  second computer readable program code means for causing the computer to determine a phase for servicing a subset of the one or more sessions;
  third computer readable program code means for causing the computer to set a timing reference for the period, wherein the timing reference is based upon the phase;
  fourth computer readable program code means for causing the computer to determine a packet assembly time;
  fifth computer readable program code means for causing the computer to derive a start time for assembling a packet from the packet assembly time and the timing reference;
  sixth computer readable program code means for causing the computer to reset the timing reference in response to detecting packet loss or unused grants; and
  seventh computer readable program code means for assembling a packet beginning at the start time.

17. The computer program product according to claim 16, further comprising:
  eighth computer readable program code means for causing the computer to reset the periodicity in response to detecting packet loss or unused grants.

18. The computer program product according to claim 16, further comprising:
  eighth computer readable program code means for causing the computer to maintain the timing reference in response to detecting a silence period.

* * * * *